United States Patent
Wright et al.

(10) Patent No.: US 8,397,506 B1
(45) Date of Patent: Mar. 19, 2013

(54) TURBO-ALTERNATOR-COMPRESSOR DESIGN FOR SUPERCRITICAL HIGH DENSITY WORKING FLUIDS

(76) Inventors: Steven A. Wright, Albuquerque, NM (US); Robert L. Fuller, Conifer, CO (US)

( * ) Notice: Subject to any disclaimer, the term of this patent is extended or adjusted under 35 U.S.C. 154(b) by 868 days.

(21) Appl. No.: 12/477,259

(22) Filed: Jun. 3, 2009

(51) Int. Cl.
*F01K 1/00* (2006.01)
*F01D 11/00* (2006.01)

(52) U.S. Cl. ............... 60/643; 60/645; 60/650; 60/682; 415/110

(58) Field of Classification Search .................. 60/643, 60/645, 605.2, 650, 682; 415/110–113
See application file for complete search history.

(56) References Cited

U.S. PATENT DOCUMENTS

| | | | | |
|---|---|---|---|---|
| 4,370,106 | A * | 1/1983 | Lauterbach | 417/407 |
| 4,659,288 | A * | 4/1987 | Clark et al. | 416/186 R |
| 5,024,057 | A * | 6/1991 | Kawamura | 60/597 |
| 5,074,115 | A * | 12/1991 | Kawamura | 60/608 |
| 6,145,313 | A * | 11/2000 | Arnold | 60/605.2 |
| 7,946,118 | B2 * | 5/2011 | Hippen et al. | 60/605.3 |
| 2004/0057847 | A1* | 3/2004 | Wild | 417/407 |
| 2006/0123785 | A1* | 6/2006 | Sundin et al. | 60/612 |
| 2008/0038109 | A1* | 2/2008 | Sandstede et al. | 415/111 |
| 2009/0066090 | A1 | 3/2009 | Boone et al. | |

OTHER PUBLICATIONS

C. Dellacorte, Gas Bearing Development for SCO2 Applications, *Presentation at NASA Glenn Research Center*, (2006) Cleveland, Ohio.

Wright S.A., Preliminary Results of Dynamic System Model for a Closed-Loop Brayton Cycle Coupled to a Nuclear Reactor, *Proceedings 1st Intl. Energy Conversion Engineering Conf.*, (Aug. 17-21, 2003), Portsmouth, VA.
Steven A. Wright, Measured and Modeled Turbomachinery Operating Characteristics in a Closed Brayton Cycle Test Loop, ANS Winter Meeting, (Nov. 12-16, 2006) pp. 855-857, Albuquerque, NM.
S. A. Wright, Robert Fuller, et. al., Operational Results of a Closed Brayton Cycle Test-Loop, *Proceedings of Space Tech. and Apps. Intl. Forum (STAIF-2005)* (Feb. 2005), p. 699, Albuquerque, NM.
S. A. Wright, and R. J. Lipinski, Operational Curves for HTGR's Coupled to Closed Brayton Cycle Power Conversion Systems, in *Proceedings of Intl. Congress on Advances in Nuclear Power Plants* (Jun. 4-8, 2006), Reno, Nevada.
S. A. Wright and R. J. Lipinski, Self-Driven Decay Heat Removal in a GCR Closed Brayton Cycle Power System, *Proceedings of Intl. Congress on Advances in Nuclear Power Plants*, (Jun. 4-8, 2006), Reno, NV.
S.A. Wright and P.S. Pickard, Impact of Closed Brayton Cycle Test Results on Gas Cooled Reactor Operation and Safety, in *Proceedings of Intl. Congress on Advances in Nuclear Power Plants* (May 13-18, 2007), Nice, France.

(Continued)

*Primary Examiner* — Hoang Nguyen
(74) *Attorney, Agent, or Firm* — Daniel J. Jenkins

(57) ABSTRACT

Techniques for generating power are provided. Such techniques involve a thermodynamic system including a housing, a turbine positioned in a turbine cavity of the housing, a compressor positioned in a compressor cavity of the housing, and an alternator positioned in a rotor cavity between the turbine and compressor cavities. The compressor has a high-pressure face facing an inlet of the compressor cavity and a low-pressure face on an opposite side thereof. The alternator has a rotor shaft operatively connected to the turbine and compressor, and is supported in the housing by bearings. Ridges extending from the low-pressure face of the compressor may be provided for balancing thrust across the compressor. Seals may be positioned about the alternator for selectively leaking fluid into the rotor cavity to reduce the temperature therein.

29 Claims, 5 Drawing Sheets

OTHER PUBLICATIONS

Steven A. Wright, Non-Nuclear Validation Test Results of a Closed Brayton Cycle Test-Loop, *Proceedings of Space Technology and Applications Intl. Forum-STAIF* (2007); AIP Conf. Proceedings (2007), vol. 880, pp. 157-166.

Steven A. Wright, Supercritical Brayton Cycle Nuclear Power System Concepts, *Proceedings of Space Tech. and Apps. Intl. Forum-STAIF* (2007); AIP Conf. Proceedings (2007), vol. 880 pp. 597-604.

J. E. Vrancik, *Prediction of Windage Power Loss in Alternators, NASA Technical Note* (Oct. 1968), NASA TN-D-4849.

V. Dostal, M.J. Driscoll, P. Hejzlar, "*A Supercritical Carbon Dioxide Cycle for Next Generation Nuclear Reactors*", MIT-ANP-TR-100 (Mar. 10, 2004).

Stephen F. Gillette, *CHP Case Studies—Saving Money and Increasing Security*, Capstone Turbine Corporation. Abstract [Online] [Retrieved on May 14, 2009]. Retrieved From the Internet: <URL: files.harc.edu/Sites/GulfCoastCHP/CaseStudies/VeronaItalyBauli. pdf >.

Steven A. Wright and Travis Sanchez, *Dynamic Modeling and Control of Nuclear Reactors Coupled to Closed Loop Brayton Cycle Systems Using SIMULINK*, in Proceedings of Space Technology and Apps. Int. Forum-STAIF 2005: AIP Conf. Proceedings, (Feb. 6, 2005), vol. 746, pp. 991-1004.

Steven A. Wright and Ronald J. Lipinski, Pin-Type Gas Cooled Reactor for Nuclear Electric Propulsion, *Proceedings of Space Technology and Apps. Intl. Forum-STAIF* (2003); AIP Conf. Proceedings (Jan. 28, 2003), vol. 654, pp. 408-419.

Steven A. Wright and Raymond D. Beets, Application of Digitally-Controlled-Reactor Architecture to Space Reactors, *Proceedings of ANS/ENS Intl. Winter Meeting* (Nov. 2003), pp. 542-543.

Motor Design (Barber-Nichols Inc.) (2009), [Retrieved on Apr. 13, 2009]. Retrieved From the Internet: <URL: http://www.barber-nichols.com/capabilities/engineering_capabilities/motor_design/default.asp>.

Supercritical CO2 Pumps (Barber-Nichols Inc.) (2009), [Retrieved on Apr. 13, 2009]. Retrieved From the Internet: <URL:http://www.barber-nichols.com/products/specialty_products/supercritical_CO2_pumps/default.asp>.

Turbocompressors (Barber-Nichols Inc.) (2009), [Retrieved on Apr. 13, 2009]. Retrieved From the Internet: <URL:http://www.barber-nichols.com/products/blowers_and_compressors/turbocompressors/default.asp>.

Steven A. Wright, Non-Nuclear Validation Test Results of a Closed Brayton Cycle Test-Loop, Proceedings of Space Technology and Applications Intl. Forum-STAIF (2007); AIP Conf.

Steven A. Wright, Supercritical Brayton Cycle Nuclear Power System Concepts, Proceedings of Space Tech. and Apps. Intl. Forum-STAIF (2007); AIP Conf. Proceedings (2007), vol.

Steven A. Wright, et al., Initial Status and Test Results from a Supercritical CO2 Brayton Cycle Test Loop, Proceedings of ICAPP '08, Anaheim ,CA, Jun. 8-12, 2008, Paper 8266.

Steven A. Wright, et al.,Supercritical CO2 Brayton Cycle Compression and Control Near the Critical Point, Proceedings of ICAPP '08, Anaheim ,CA, Jun. 8-12, 2008, Paper 8347.

Steven A. Wright, et al.,Supercritical CO2 Test Loop Operation and First Test Results, Proceedings of ICAPP '09 Tokyo, Japan, May 10-14, 2009 Paper 9152.

Steven A. Wright, et al., Supercritical CO2 Brayton Cycle Power Generation Development Program and Initial Test Results, SNL Report, SAND2008-7277A, Nov. 1, 2008.

\* cited by examiner

TURBO-ALTERNATOR-COMPRESSOR DESIGN FOR SUPERCRITICAL HIGH DENSITY WORKING FLUIDS

STATEMENT OF GOVERNMENT INTEREST

This invention was developed under Contract DE-AC04-94AL85000 between Sandia Corporation and the U.S. Department of Energy. The U.S. Government has certain rights in the invention.

BACKGROUND OF THE INVENTION

1. Field of the Invention

The present invention relates to techniques for generating power. More particularly, the invention relates to techniques for generating power using a thermodynamic system with a working fluid passing therethrough.

2. Background of the Related Art

Various devices have been developed to generate power to perform necessary work. For example, engines have been designed to propel vehicles, operate factory equipment and generate electricity. Some such engines take an input, such as coal, gas or other fuel, and convert such fuel into an output, typically in the form of kinetic energy, to perform the work.

Over time, power generators have been refined in an effort to improve performance and/or efficiency. Advancements in performance have enabled the development of more sophisticated devices capable of operating high power equipment, such as nuclear reactors, rockets and/or jet engines. See, for example, the technology path of turbomachinery as described in C. DellaCorte, *Gas Bearing Development for SCO2 Applications*, Presentation at NASA Glenn Research Center, Cleveland, Ohio, 2006.

One enhancement of power generation is the development of the Brayton Cycle (sometimes referred to as the Joule Cycle). With the Brayton Cycle, working fluid is compressed by a compressor and passed through a turbine to generate power for performing desired work. The Brayton Cycle typically involves a closed loop system that returns the fluid from the turbine back to the compressor for reuse. Examples of Brayton Cycles are described in the following articles: Wright S. A., *Preliminary Results of Dynamic System Model for a Closed-Loop Brayton Cycle Coupled to a Nuclear Reactor,*" Proceedings 1st International Energy Conversion Engineering Conference*, Portsmouth, Va., (Aug. 17-21, 2003); Steven A. Wright, *Measured and Modeled Turbomachinery Operating Characteristics in a Closed Brayton Cycle Test Loop*, ANS Winter Meeting, Albuquerque, N. Mex., (Nov. 12-16, 2006), p. 855-57; S. A. Wright, Robert Fuller, et. al., *Operational Results of a Closed Brayton Cycle Test-Loop, Proceedings of Space Technology and Applications International Forum (STAIF*-2005) Albuquerque, N. Mex. (February, 2005), pg 699; S. A. Wright, and R. J. Lipinski *Operational Curves for HTGR's Coupled to Closed Brayton Cycle Power Conversion Systems, Proceedings of International Congress on Advances in Nuclear Power Plants*, Reno, Nev. (Jun. 4-8 2006); S. A. Wright and R. J. Lipinski, *Self-Driven Decay Heat Removal in a GCR Closed Brayton Cycle Power System, Proceedings of International Congress on Advances in Nuclear Power Plants*, Reno Nev., (Jun. 4-8, 2006); S. A. Wright and P. S. Pickard, *Impact of Closed Brayton Cycle Test Results on Gas Cooled Reactor Operation and Safety, Proceedings of International Congress on Advances in Nuclear Power Plants*, Nice, France (May 13-18, 2007); Steven A. Wright, *Non-Nuclear Validation Test Results of a Closed Brayton Cycle Test-Loop, Proceedings of Space Technology and Applications International Forum (STAIF-*2007), Albuquerque, N. Mex., (Feb. 11-15, 2007); AIP Conference Proceedings, Volume 880, (2007) pp. 157-166; and Steven A. Wright, *Supercritical Brayton Cycle Nuclear Power System Concepts, in Proceedings of Space Technology and Applications International Forum (STAIF-*2007), Albuquerque, N. Mex., (Feb. 11-15, 2007); AIP Conference Proceedings, Volume 880, (2007) pp. 597-604.

Various factors may affect the operation of power generation systems. For example, inefficiencies, such as windage, can affect performance as described in J. E. Vrancik, *Prediction of Windage Power Loss in Alternators*, NASA Technical Note, NASA TN-D-4849 (October 1968), the entire contents of which is hereby incorporated by reference. Additionally, certain fluids used in a power generation system can affect operation as described, for example, in V. Dostal, M. J. Driscoll, P. Hejzlar, *A Supercritical Carbon Dioxide Cycle for Next Generation Nuclear Reactors*, MIT-ANP-TR-100 (Mar. 10, 2004), the entire contents of which is hereby incorporated by reference.

Despite the previous advancements in power generation, there remains a need to provide techniques for dealing with the various operational factors and/or optimizing the operation of power generation systems. It is desirable that power generation systems utilize closed loop Brayton Cycles that are capable of operating at even supercritical conditions (e.g., high-pressure and high density). In such cases, it is desirable to provide features to isolate components of the system from harsh conditions, provide hermetic conditions and/or to handle the loads applied to the system. Preferably, such systems are capable of cooling components, reducing losses and/or failures, operating at even extreme conditions (e.g., high thrust loads, pressures and/or densities) and/or otherwise enhancing operation. The present invention is provided to address these and other needs.

SUMMARY OF THE INVENTION

In at least one aspect, the present invention relates to a thermodynamic system for generating power including a housing, a turbine positioned in a turbine cavity of the housing, a compressor positioned in a compressor cavity of the housing, an alternator positioned in a rotor cavity between the turbine and compressor cavities, and a plurality of ridges extending from the low-pressure face of the compressor for pumping a working fluid as it passes over the compressor. The compressor has a high-pressure face facing an inlet of the compressor cavity and a low-pressure face on an opposite side thereof. The alternator has a rotor shaft operatively connected to the turbine and compressor, and is supported in the housing by bearings. The working fluid is pumped by the ridges, whereby a pressure differential between the high-pressure face and the low-pressure face is reduced, such that thrust is balanced across the compressor.

In another aspect, the present invention relates to a thermodynamic system for generating power for performing work including a housing, a turbine positioned in a turbine cavity of the housing, a compressor positioned in a compressor cavity of the housing, an alternator positioned in a rotor cavity between the turbine and compressor, and a plurality of seals positioned about the alternator for selectively isolating the rotor cavity from the turbine and compressor cavities. The alternator has a rotor shaft operatively connected to the turbine and compressor, and is supported in the housing by bearings. The seals selectively isolate the rotor cavity from the turbine and compressor cavities whereby a working fluid is selectively leaked into the rotor cavity to reduce the temperature therein.

In yet another aspect, the invention relates to a method of generating power for performing work involving providing a thermodynamic system including a housing, a turbine positioned in a turbine cavity of the housing, a compressor positioned in a compressor cavity of the housing, and an alternator positioned in a rotor cavity between the turbine and compressor cavities. The compressor has a high-pressure face facing an inlet of the compressor cavity and a low-pressure face on an opposite side thereof, the low-pressure face having a plurality of ridges. The alternator has a rotor shaft operatively connected to the turbine and compressor, and is supported in the housing by bearings. The method further involves compressing a working fluid by passing the working fluid across the compressor, generating a power output by passing the compressed working fluid across the turbine, and balancing thrust across the compressor by pumping the working fluid with a plurality of ridges as the working fluid passes over the compressor.

In another aspect, the invention relates to a method of generating power for performing work involving providing a thermodynamic system including a housing, a turbine positioned in a turbine cavity of the housing, a compressor positioned in a compressor cavity of the housing, and an alternator positioned in a rotor cavity between the turbine and compressor cavities. The alternator has a rotor shaft operatively connected to the turbine and compressor, and supported in the housing by bearings. The rotor cavity is fluidly isolated from the turbine and compressor cavities via seals. The method further involves compressing a working fluid by passing the working fluid across the compressor, generating a power output by passing the compressed working fluid across the turbine, and cooling the rotor cavity by selectively leaking working fluid from the compressor cavity into the turbine cavity via at least one selected from the group consisting of the plurality of seals.

Finally, in another aspect, the invention relates to a method of generating power for performing work involving providing a thermodynamic system including a housing, a turbine positioned in a turbine cavity of the housing, a compressor positioned in a compressor cavity of the housing and an alternator positioned in a rotor cavity between the turbine and compressor cavities. The alternator has a rotor shaft operatively connected to the turbine and compressor, and supported in the housing by bearings. The method further involving compressing a working fluid by passing the working fluid across the compressor, generating a power output by passing the compressed working fluid across the turbine, and pumping the working fluid from the rotor cavity to selectively lower pressure therein.

These and other aspects of the invention will be described herein.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. These drawings are used to illustrate only typical embodiments of this invention, and are not to be considered limiting of its scope, for the invention may admit to other equally effective embodiments. The figures are not necessarily to scale and certain features and certain views of the figures may be shown exaggerated in scale or in schematic in the interest of clarity and conciseness.

DETAILED DESCRIPTION OF THE INVENTION

Presently preferred embodiments of the invention are shown in the above-identified Figures and described in detail below.

Figure 1:
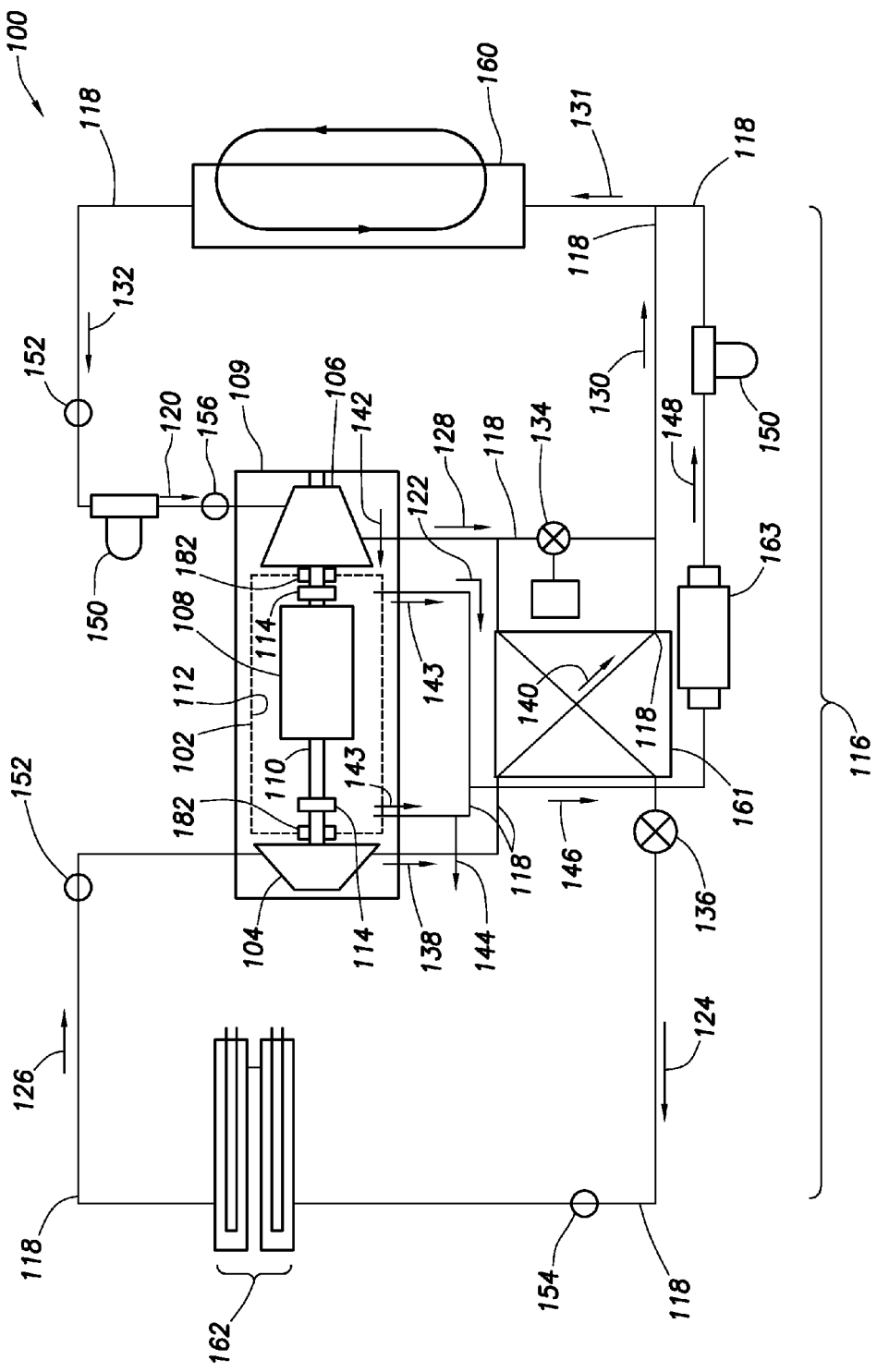
FIG. 1 shows a schematic view of a thermodynamic system for generating power, the system having a Turbo Alternator Compressor (TAC) in a closed loop Brayton Cycle.

FIG. 1 schematically depicts a thermodynamic system 100 for generating power. The thermodynamic system 100 includes a Turbo-Alternator-Compressor (referred to herein as a "TAC") 102 for generating power. The TAC 102 has a turbine 104, a compressor 106 and an alternator 108 therebetween. The turbine 104, compressor 106 and alternator 108 are positioned within a housing 109.

Referring still to FIG. 1, the alternator 108 has a rotor shaft 110. The turbine 104 is operatively connected to the rotor shaft 110 for rotation therewith. The compressor 106 is also operatively connected to the rotor shaft 110 for rotation therewith. The alternator 108 is positioned in a rotor (or low) pressure cavity 112 with bearings 114 and seals 182 as will be described further herein.

The TAC 102 is fluidly connected to fluid circuit 116. As shown, the fluid circuit 116 has a plurality of conduits 118 that form a continuous or closed-loop flow path for passage of a working fluid. The working fluid flows through the fluid circuit 116 as indicated by the arrows 120-132, 138-148. The TAC 102 and fluid circuit 116 form a closed-loop Brayton Cycle for generating power.

As indicated by arrow 120, the working fluid passes into the compressor 106 for compression therein. The working fluid flows from the compressor 106 and to the turbine 104 as indicated by arrows 122-126. A portion of the working fluid from the compressor 106 may be diverted back to the compressor as indicated by arrows 128-132. The working fluid passes from the turbine 104 as indicated by arrows 138-140, and joins the working fluid exiting the compressor 106 as it returns to the compressor as indicated by arrows 130-132. Valves, such as valve 134 and 136, may be positioned in the fluid circuit 116 to selectively divert the working fluid along the desired path.

A portion of the working fluid may from time to time selectively be leaked into the rotor cavity 112 as indicated by arrow 142 (as described further herein). Fluid from the rotor cavity may selectively and/or passively be released therefrom. The fluid may be drained from the fluid circuit 116 as indicated by arrow 144. The fluid may also (or alternatively) be released from the rotor cavity 112 as indicated by arrows 146, 148, and returned to the compressor 106 as indicated by arrows 131, 132. The fluid may be pumped from the rotor cavity 112, using a pump, such as gas booster 163. Pump 163 is provided in the fluid circuit 116 to increase the pressure of the working fluid as it exits the rotor cavity 112.

The fluid circuit 116 is provided with a chiller 160 for cooling the working fluid before it enters the compressor 106. The fluid circuit 116 is also provided with a heater 162 for heating the working fluid before it enters the turbine 104. The fluid circuit 116 is also provided with a recuperator 161 for recovering wasted heat from the fluid exiting the compressor 106, and using that wasted heat to cool fluid exiting the turbine 104. While the fluid circuit is depicted as having a chiller 160, a heater 162 and a recuperator 161, it will be appreciated that one or more heat exchangers may be positioned at various locations throughout the fluid circuit to selectively adjust the fluid parameters as it flows therethrough. The fluid circuit 116 is also provided with additional devices, such as flow meters 150, thermometers 152, pressure gauges 154, and densitometers 156, for measuring parameters of the working fluid.

While the thermodynamic system 100 is depicted as having certain devices, such 205 as valves (134, 136), heat exchangers (chiller 160, heater 162), pumps (gas booster 163), flow meters 150, thermometers 152, pressure gauges 154, and densitometers 156, along the fluid circuit 116, it will be appreciated that one or more of these and/or other devices may be positioned in various locations about the thermodynamic system 100 for manipulating, measuring and/or analyzing the working fluid as desired. The configuration of the fluid circuit 116 and/or its features, device and/or components may be adapted as desired so that the thermodynamic system 100 operates as desired. For example, the thermodynamic system 100 may also be provided with one or more TACs or other components and/or devices described herein.

As used herein, a "working fluid" refers to a fluid usable in the thermodynamic system 100 to operate the TAC 102 to generate the desired work. The working fluid preferably has a temperature, pressure and density that permits flow through the fluid circuit 116 to perform the desired operation. The working fluid may be any fluid that may be selectively heated, cooled, pressurized, drained, diverted and/or otherwise manipulated through the thermodynamic system 100 to generate power. Examples of fluids that may be used as working fluids are inorganic compounds (e.g., SF6), noble gases (e.g., Xenon), olefins (e.g., ethylene), fuels (e.g., propane), refrigerants (e.g, C4F8), and combinations thereof. Additives, mixtures, injections and other varieties of one or more fluids may be used as working fluid and/or in combination therewith.

The selected working fluid may also be a supercritical fluid (e.g., CO2, SF6, Xenon, propane, C4F8, and/or most other refrigerants). A "supercritical working fluid" is a working fluid that operates at temperatures and pressures that are above but near the critical temperature and pressure for that fluid. A supercritical working fluid is typically a high density and high-pressure gas using a single phase fluid, such as carbon dioxide (CO2). Generally, this means that the fluid will operate at high-pressures and high densities. For example, CO2 has a critical temperature of about 88° F. (304 K), a critical pressure of about 1070 psia (7.38 MPa), and a fluid density of about 47% the density of water (at room temperature and pressure).

The compressor 106 and turbine 104 are preferably adapted to operate with a supercritical working fluid. Other working and/or supercritical fluids may also be used. Preferably, the supercritical working fluid operates with Brayton Cycles that have compressors that operate near the critical temperature and pressure of the supercritical working fluid. The actual choice for the working fluid may depend on factors, such as waste heat rejection temperature, maximum turbine inlet temperature that can be obtained using the heat source that is available, materials compatibility, decomposition temperature and other operational considerations.

Figure 2:
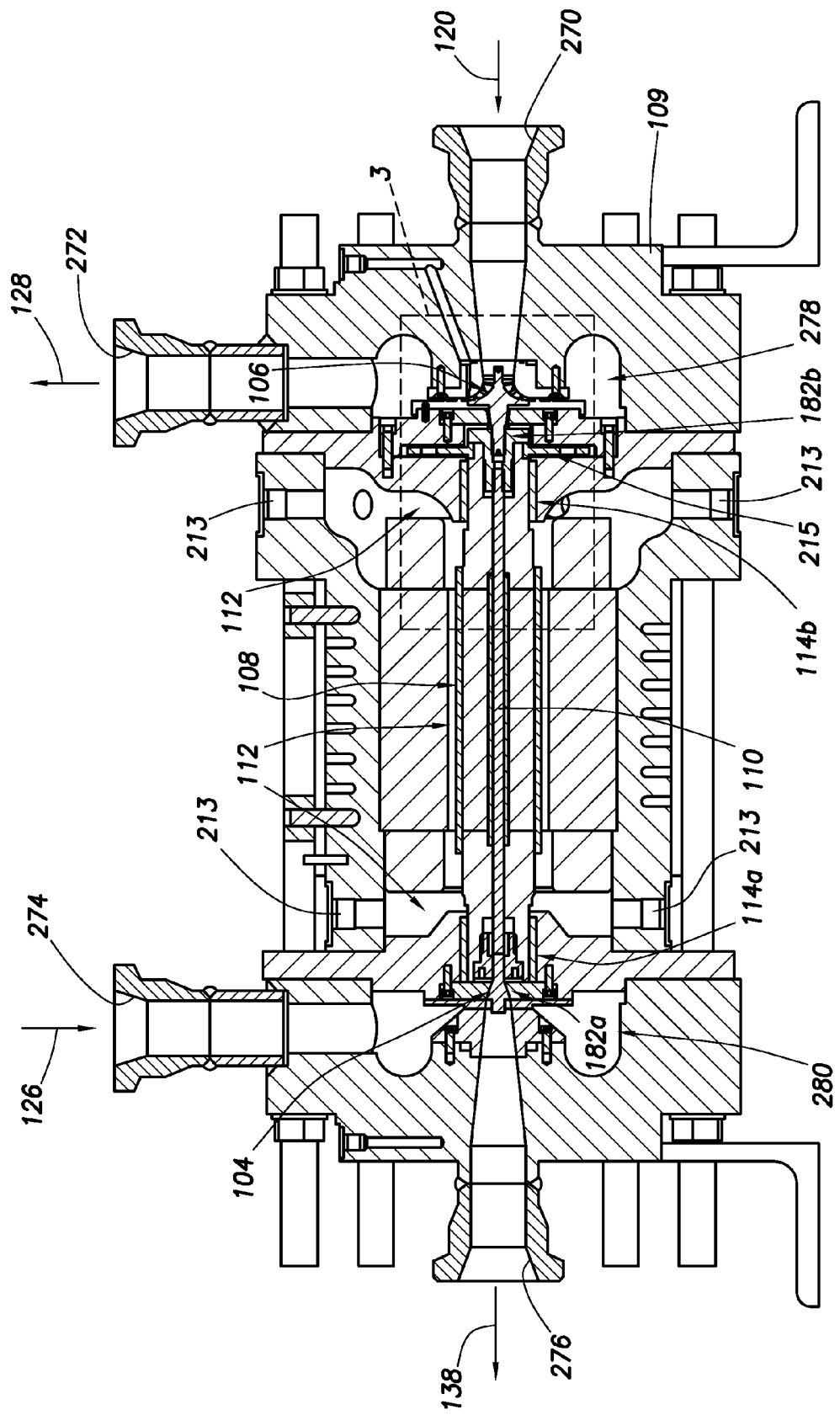
FIG. 2 shows a longitudinal cross-sectional view of the TAC of FIG. 1, having a turbine, compressor, and alternator.

FIG. 2 depicts TAC 102 in greater detail. The TAC 102 is preferably configured to generate power as depicted, for example in the thermodynamic system 100 of FIG. 1. However, it will be appreciated that the TAC 102 may be used in other systems.

TAC 102 includes the turbine 104 and the compressor 106, with the alternator 108 positioned therebetween. The turbine 104, compressor 106 and alternator 108 are positioned in the housing 109 along the rotor shaft 110. These components preferably are integrated for cooperative operation. The turbine 104 operatively connects to rotor shaft 110 for rotation therewith. The compressor 106 is also operatively connected to rotor shaft 110 for rotation therewith.

Bearings (114a,b, 215) are positioned in the housing 109 to provide support. Journal (or gas) bearings 114a,b are positioned about the alternator 108 within the housing 109 to provide support thereto. As depicted, one journal bearing 114a is positioned about the alternator 108 near the turbine 104, and another journal bearing 114b is positioned about the alternator 108 near the compressor 106. Preferably, the journal bearings are configured to absorb forces (loads) applied to the alternator 108. These journal bearings 114a,b may be used to prevent radial movement and/or deflection of the housing 109 and/or the components therein. For example, the journal bearings 114a,b may be used to reduce deflection of the rotor shaft 110 during operation.

Thrust bearings 215 are positioned about the alternator 108 near the compressor 106 and within the housing 109 to provide support thereto. As depicted, the thrust bearings 215 are positioned between the journal bearing 114b and the compressor 106. Preferably, the thrust bearings 215 are configured to absorb axial forces (loads) applied to the alternator 108. These thrust bearings 215 may be used to prevent movement and/or deflection of the housing 109 and/or the components therein. For example, the thrust bearings 215 may be used to absorb axial thrust applied to the compressor 106 during operation.

Preferably, the bearings (114, 215) are positioned about the housing 109 to support components therein and/or to absorb forces (or loads) applied to the various components. The bearings (114, 215) may be any bearings positionable in the TAC 102 for operating with the components therein. For example, the bearings may be gas foil, ball, tilt pad, magnetic and/or other bearings. The bearings 114, 215 are preferably adapted to enhance operation and/or resist equipment damage. While the bearings 114, 215 are depicted in a certain configuration, it will be appreciated that various types and/or number of bearings may be positioned at various locations in and/or about the TAC to enhance operation. Preferably, bearings are positioned within rotor cavity 112 as will be described further herein.

The housing 109 has a compressor inlet 270 and a compressor outlet 272 in fluid communication with the fluid circuit 116 (FIG. 1). The working fluid passes from the fluid circuit 116 and to the compressor 106 via compressor inlet 270 as indicated by arrow 120. The working fluid is compressed as it flows past the compressor 106 and into a compressor cavity 278. The compressed working fluid flows out of compressor cavity 278, and out the compressor outlet 272 to the fluid circuit 116 as indicated by arrow 128.

Turbine 104 also has a turbine inlet 274 and a turbine outlet 276 in fluid communication with the fluid circuit 116 (FIG. 1). The working fluid passes from the fluid circuit 116 and into a turbine cavity 280 via turbine inlet 274 as indicated by arrow 126. The working fluid drives the turbine 104 as it flows through the turbine cavity 280. The working fluid flows past the turbine 104, out of the turbine cavity 280, and to the fluid circuit 116 via turbine outlet 276 as indicated by arrow 138. As the turbine 104 is rotated, it generates a power output that may be used to perform work.

The alternator 108 is positioned within a rotor (or low-pressure) cavity 112 of the housing 109. The alternator may be, for example, a permanent magnet alternator with a rotor shaft 110 rotationally movable therein. Rotor cavity 112 is positioned within housing 109 between the compressor cavity 278 and the turbine cavity 280. The rotor cavity 112 typically has a pressure lower than the pressure in the compressor and turbine cavities (278, 280).

The rotor cavity 112 is isolated from the compressor and turbine cavities (278, 280) by seals 182a,b. The seals 182a,b preferably provide a seal about the alternator 108. Seal 182a is positioned in the housing 109 between the turbine 104 and the alternator 108. Seal 182a is also positioned between the turbine 104 and the journal bearing 114a. Seal 182b is positioned in the housing 109 between the compressor 106 and the alternator 108. Seal 182b is also positioned between the compressor 106 and the journal bearing 114b. In this configuration, bearings 114,215 are positioned within the rotor cavity between the seals 182a,b.

During operation, the bearings may be exposed to factors, such as heavy loads, high temperatures, high-pressures, corrosive fluids, and other harsh conditions. Such harsh conditions may cause components, such as the bearings, to fail. Preferably, the bearings 114, 215 are placed in the rotor cavity 112 to isolate the bearings from harsh conditions in the system. Seals 182a,b are positioned about the alternator to isolate the rotor cavity 112 from the compressor and turbine cavities 278, 280. In this configuration, the bearings 114, 215 are contained in the lower pressure rotor cavity 112 away from the high-pressure working fluid.

The seals 182a,b preferably selectively permit the passage of working fluid from the compressor cavity 278 and/or turbine cavity 280, and into the rotor cavity 112. Preferably, the thermodynamic system 100 is configured such that fluid leaks past the seals 182 to reduce the temperature in the rotor cavity rotor cavity 112 as will be described further below. Preferably, the seals 182 operate in a manner that is compatible with the bearings and/or assists in the operation thereof. In cases where the working fluid exiting the seals is a liquid at the selected rotor cavity pressure, liquid film bearings, such as tilt pad bearings, may be used.

The seals 182a,b may be any seal(s) capable of fluidly isolating portions of the housing 109. Such seals may be, for example, labyrinth gas seals, dry liftoff seals, brush seals, windback seals, abradable seals, hole pattern seals and/or other compatible seals. As depicted, the seals 182a,b are positioned between the rotor cavity 112 and the turbine and compressor cavities (278, 280). However, it will be appreciated that one or more seals 182 may be placed in various locations about the TAC 102 to provide fluid isolation as desired.

The rotor cavity 112 has ports 213 in fluid communication with the fluid circuit 116 (FIG. 1). The ports 213 allow fluid to release from the rotor cavity 112 as indicated by arrows 143 (FIG. 1). Typically, fluid release occurs when working fluid passes from the compressor and/or turbine cavities (278,280) and into the rotor cavity 112. Fluid passes from the rotor cavity 112 via ports 213 and into the fluid circuit as indicated by arrows 143. An auxiliary pump, such as gas booster 163 of FIG. 1, may 335 be placed in fluid communication with the rotor cavity 112 to selectively pump fluid therefrom.

Components, such as bearings and alternators, used in thermodynamic systems may have difficulty operating in harsh conditions, such as at high temperature or pressures. The components may also have difficulty operating when exposed to supercritical fluids that can have a corrosive effect. The pressure in the rotor cavity 112 may be lowered, for example by pumping fluid therefrom via pump 163, in such a manner as to protect the bearings from high-pressures during operation. The pressure in the rotor cavity 112 is preferably adjusted to enable operation of the TAC at even high-pressures, densities and/or temperatures, such as those of supercritical fluids.

The seals 182 and pump 163 may be used to provide a system that is hermetic. As the working fluid flows from the rotor cavity 112, the fluid may be recirculated back into the fluid circuit 116, rather than being releasing into the surrounding environment. In cases where working fluids are flammable, toxic, or otherwise undesirable for release from the system, recirculation of the working fluid through the system may be desirable.

While the dimensions of the TAC 102 and portions thereof may be of any dimension capable of generating power, the TAC preferably has a compact configuration. Working fluids having high density and high-pressure, such as supercritical fluids, may allow for a more compact configuration. A compact configuration may be desirable to reduce costs, adapt to limited space environments, reduce windage and/or enhance other operational factors. However, in some cases, operational limitations of, for example working fluid characteristics, may limit the ability to provide a compact design. The TAC dimensions are preferably configured according to fluid selection, rotor dynamics, desired power requirements, specific conditions and/or to generate power for various applications.

Figure 3:
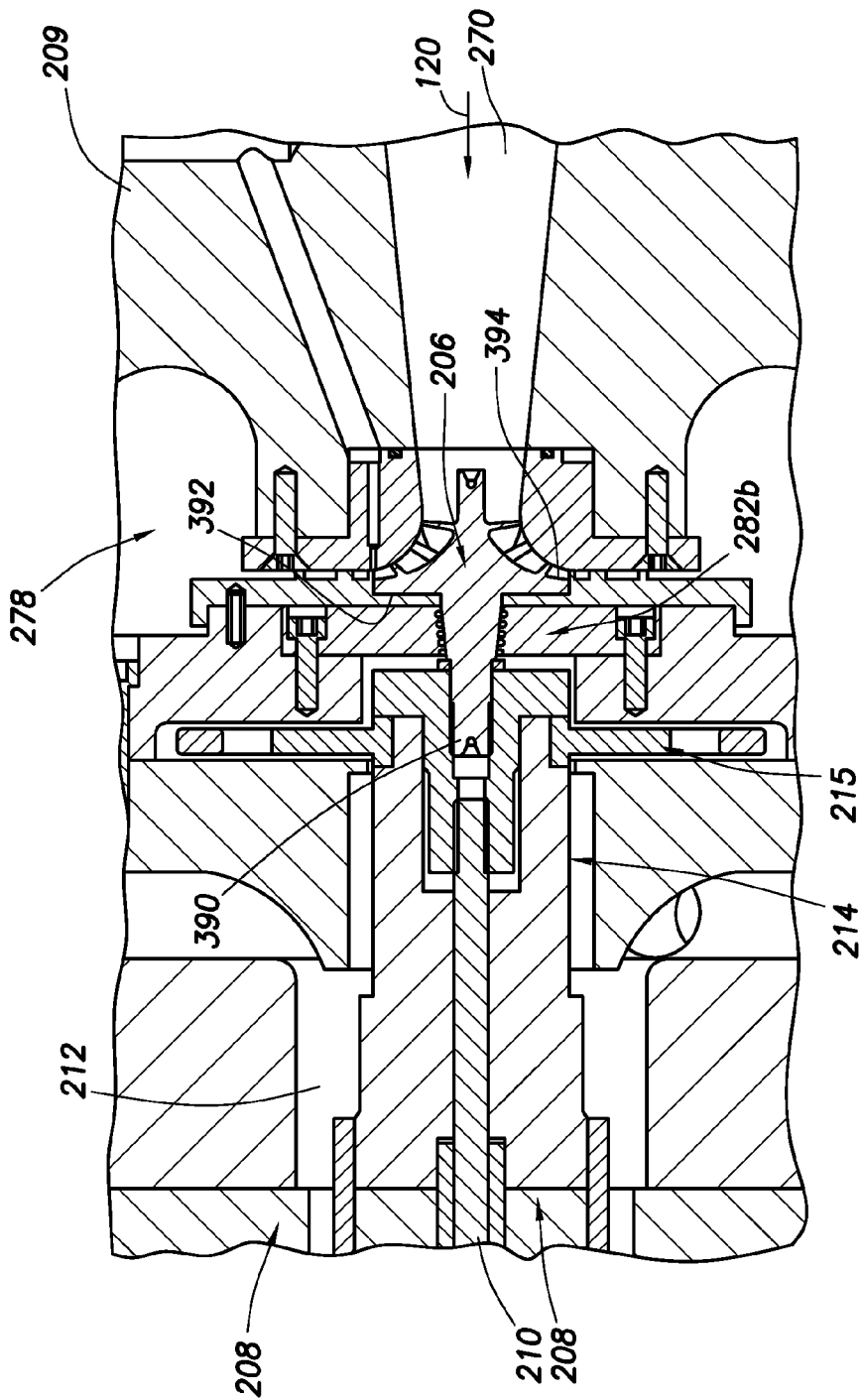
FIG. 3 shows a detailed view of a portion of the TAC of FIG. 2 taken along section 3 and depicting the compressor, a thrust bearing, a journal bearing and a seal.

FIG. 3 is a detailed view of a portion 3 of the TAC 102 of FIG. 2. This view depicts seal 182b and compressor 106 in greater detail. As shown, seal 182b is positioned about compressor 106 and within housing 109. As described previously, seal 182b preferably selectively permits the passage of working fluid from the compressor cavity 278, and into the rotor cavity 112.

Compressor cavity 278 typically maintains a pressure higher than the pressure in the rotor cavity 112. As pressure differentials between the compressor cavity 278 and the rotor cavity 112 increase and/or as deflection of the rotor shaft 110 and/or other components increases, forces (loads) on the bearings 114, 215 typically increase. During this time, seal 182b preferably deforms to allow a portion of the working fluid to pass from the compressor cavity 278, over the seal 182b and into the rotor cavity 112.

The flow of working fluid past the seals 182 and into the rotor cavity preferably provides a reduction of temperature therein. The flow of the working fluid past the seals 182b and across the bearings 114, 215 preferably provides for cooling thereof. Other components in the rotor cavity, such as the rotor shaft and/or alternator, may also be cooled. Preferably, the thermodynamic system 100 is configured such that working fluid passing from the compressor cavity 278 is in the form of a gas as it leaks past the seal 182b, and turns to a liquid as it enters the rotor cavity 112 and cools the bearings 114, 215. The leakage of fluid through the seals 182 preferably expands the working fluid in an approximate isenthalpic process thereby causing the fluid to cool. Depending on the parameter of the working fluid selected, the working fluid may be manipulated such that the working fluid converts from a gas to a liquid phase to achieve the cooling effect.

Referring still to FIG. 3, the compressor 106 has an end 390 operatively connected to the alternator 108 via rotor shaft 110 for rotation therewith. The compressor 106 has a low-pressure face 392 and a high-pressure face 394. The high-pressure face 394 faces toward the compressor inlet 270. The low-pressure face 392 is on an opposite side of the high-pressure face 394, and faces toward the rotor cavity. As the working fluid flows to the compressor 106 as indicated by arrow 120 and passes over the compressor 106, the compressor 106 rotates and compresses the working fluid. The working fluid passes across the compressor 106 and into compressor cavity 278. As fluid passes over the compressor 106, is passes along the high-pressure face 394 and along the low-pressure face 392.

Figure 4:
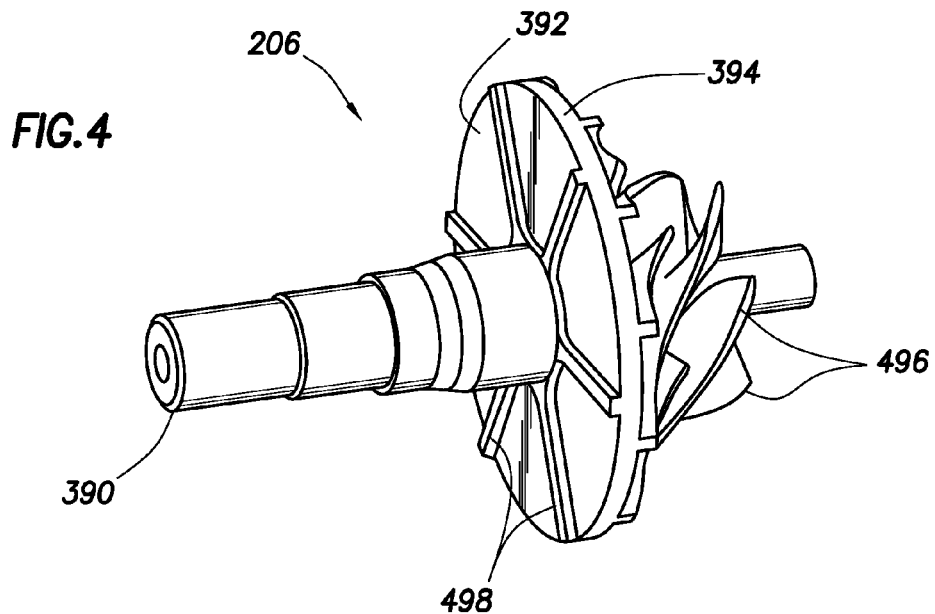
FIG. 4 shows a detailed view of the compressor of FIGS. 2 and 3 depicting a plurality of vanes and a plurality of ridges on opposite sides thereof.

FIG. 4 shows the compressor 106 in greater detail. The high-pressure face 394 of the compressor 106 has a plurality of vanes 496 extending therefrom. As shown, the plurality of vanes 496 extend from the high-pressure face 394 of the compressor 106 and toward the compressor inlet 270 (FIG. 3). The vanes 496 are depicted as having a curved shape extending from the high-pressure face 394. Preferably, the vanes 496 are configured to pressurize the working fluid and facilitate the flow of the working fluid in a manner that optimizes operation of the TAC 102 as the fluid passes over the compressor 106 for compression thereof.

The compressor 106 is also depicted as having a low-pressure face 392 with a plurality of ridges 498 thereon. The ridges 489 extend radially about the low-pressure face 392. The ridges 498 are depicted as having a linear shape extending from the low-pressure face 392 toward rotor cavity 112 (FIG. 3), but can have other shapes. Preferably, the ridges 498 are configured to act as pump-out vanes for manipulating the working fluid as it flows across the compressor 106.

Referring now to FIGS. 3 and 4, the working fluid has a pressure ($p_1$) as it flows through the compressor inlet 270 and to the compressor 106. The pressure of the working fluid increases to a pressure ($p_1$) at the high-pressure face 394 of the compressor 106 as it passes over the vanes 496 and into the compressor cavity 278. The low-pressure face 392 of the compressor 106 is at a pressure ($p_2$) which is approximately the same as the compressor inlet pressure ($p_1$).

The pressure ($p_2$) of low-pressure face 392 is lower than the pressure ($p_1$) of high-pressure face 394. A pressure differential ($\Delta p_{12}$), therefore, exists between the low-pressure face 392 and the high-pressure face 394 of the compressor 106. For example, a compressor having a diameter of 1.5 inches (3.81 cm) and a pressure of 1000 psi (6.89 MPa) at the low-pressure face and a pressure of 2000 psi (13.79 MPa) at the high-pressure face during operation has a pressure differential across the compressor that can result in axial forces along the axis of the rotor shaft of up to about 1000 lbs (4448.22 N).

Ridges 498 are preferably used to increase pressure at the low-pressure face 392 to balance the pressure differential $\Delta p_{12}$ across the compressor 106. These ridges 498 act as pump-out vanes causing the pressure on the low-pressure face 392 of the compressor 106 to increase. Preferably, the increased pressure on the low-pressure face 392 decreases the pressure differential $\Delta p_{12}$ between the low-pressure and high-pressure faces (392,394) of the compressor 106.

The pressure ($p_1$) of the high-pressure face 394 and the pressure ($p_2$) at the low-pressure face 392 are preferably balanced to reduce the thrust loads on the TAC 102. The dimensions of the ridges 498 and/or vanes 496 may be adjusted to manipulate fluid flow and/or reduce the total thrust. The manipulation of the pressures across the compressor to reduce the pressure differential $\Delta p_{12}$ and reduce the associated thrust to the thermodynamic system, preferably near or to zero, is referred to as "thrust balancing" across the compressor. Preferably, the pressures are sufficiently balanced to prevent failures, reduce losses and/or enhance operation.

The vanes 496 and/or ridges 498 preferably pump the working fluid away from the seal 182b as it flows past the compressor 106. Preferably, the compressor 106 pumps the working fluid in a manner that reduces leakage through seal 182b and/or reduces forces on the rotor shaft. Depending on the parameters (e.g., type, measurements, etc.) of the working fluid, the pressure in the compressor cavity 278 may be sufficiently high that the working fluid acts as a liquid. In such cases, the ridges 498 may be used to act as a liquid thrust bearing to handle the forces (loads) generated by the flow of the working fluid.

Figure 5:
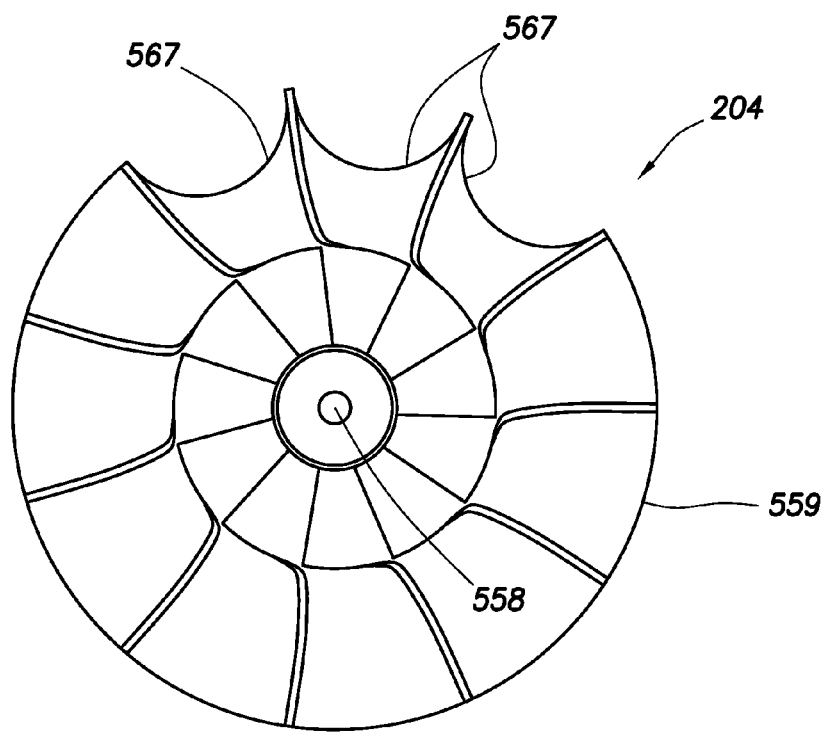
FIG. 5 shows a detailed view of the turbine of FIG. 2 depicting a plurality of cutouts thereof.

FIG. 5 shows a detailed view of turbine 104. As shown here, the turbine has a center 558 and a periphery 558. The periphery is substantially circular, except for a plurality of cutouts 567 extending towards the center 558 of the turbine 104. The cutouts 558 permit a greater quantity of fluid to pass about the turbine as it rotates in the turbine cavity 280 (FIG. 2). The size, shape and quantity of cutouts may be selected to manipulate the flow of fluid past the turbine, to adjust pressures about the turbine and/or to provide thrust balancing across the turbine.

Figure 6:
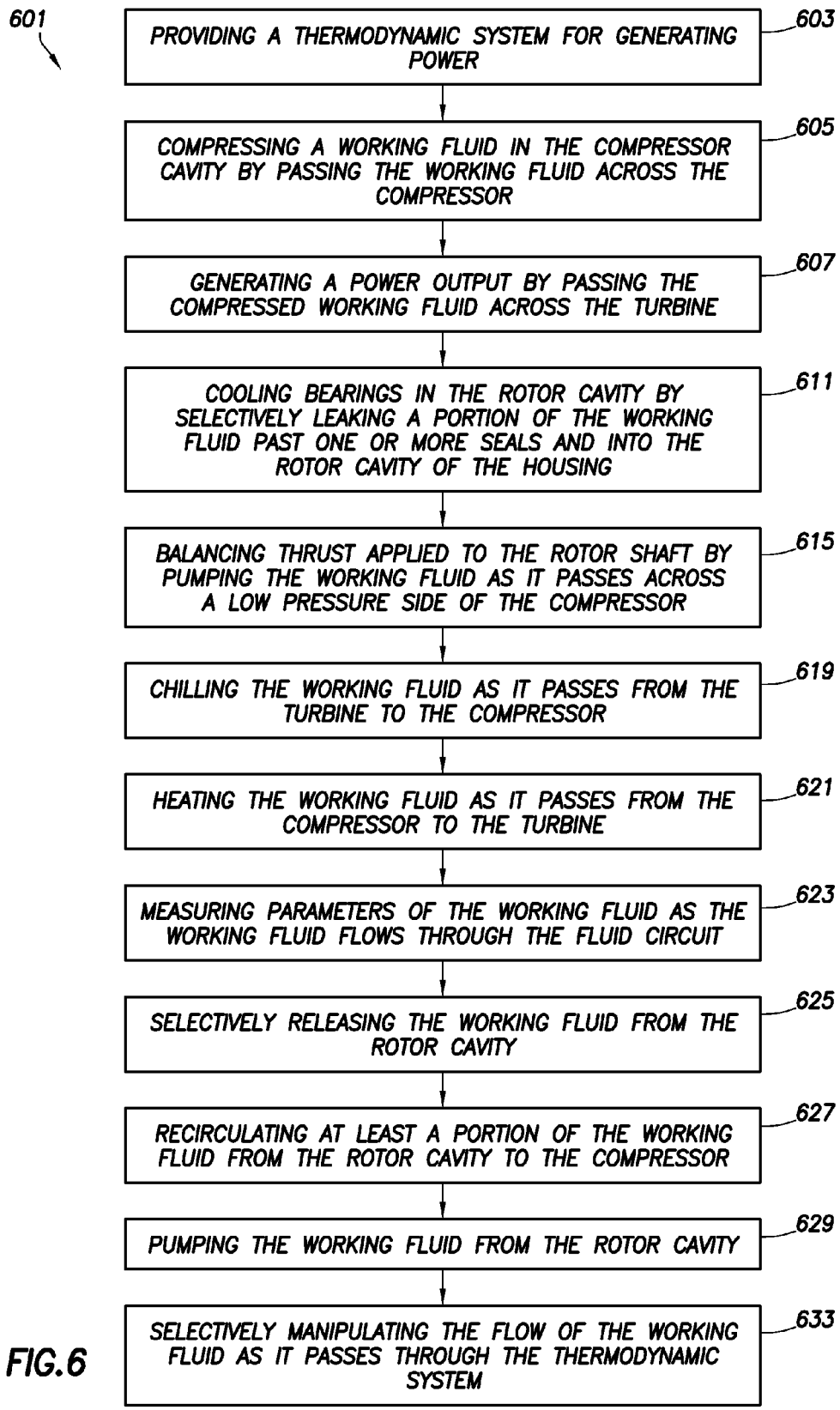
FIG. 6 is a flow chart depicting a method of generating power using the thermodynamic system of FIG. 1.

FIG. 6, depicts a method 601 of generating power. The method involves steps 603-633. The steps provided are not necessarily in order and/or performed according to a specific timing. The method is described in relation to the operation of a thermodynamic system, such as the thermodynamic system 100 and/or the TAC 102 as described with respect to FIGS. 1-4. The method involves providing a thermodynamic system for generating power (step 603). The thermodynamic system 100 includes a housing 109, an alternator 108, a turbine 104 and a compressor 106 (see FIGS. 1-4).

The working fluid is compressed (step 605) in the compressor cavity 278 by passing the working fluid across the compressor 106 (see, e.g., FIGS. 2-3). The working fluid passes across a high-pressure face 394 and a low-pressure face 392 of the compressor 106 (see, e.g., FIGS. 3-4). A power output is generated (step 607) by passing the compressed working fluid across the turbine 104 (see, e.g., FIG. 2).

TAC components, such as bearings 114,215, rotor 110 and/or alternator 108 in the rotor cavity 112, may be cooled (step 611) by selectively leaking a portion of the working fluid past one or more seals 182 and into the rotor cavity 112 of the housing 109 (see, e.g., FIGS. 2-3).

Thrust applied to the rotor shaft 110 is balanced (step 615) by pumping the working fluid as it passes across a low-pressure side 394 of the compressor 106. Preferably, the pumping reduces a pressure differential between the low-pressure face 394 and a high-pressure face 396 of the compressor 106 (see, e.g., FIGS. 2-4). Thrust may be further balanced by providing cutouts 567 in the turbine 104 to manipulate fluid flow therethrough.

The working fluid may be manipulated as it flows through the system. The working fluid may be chilled (step 619) as it passes from the turbine 104 to the compressor 106. The working fluid may be heated (step 621) as it passes from the compressor 106 to the turbine 104. Heat exchangers, such as chiller 160, recuperator 161 and/or heater 162, may be provided to adjust parameters, such as temperature, of the working fluid as it passes through the system (see, e.g., FIG. 1).

The parameters of the working fluid may be measured (623) as the working fluid flows through the fluid circuit. Various devices, such as flow meters 150, thermometers 152, pressure gauges 154, and densitometers 156, may be provided to measure fluid parameters (see, e.g., FIG. 1).

At least a portion of the working fluid may be released (625) from the rotor cavity 112. Working fluid flowing from the turbine 104 and/or compressor 106 into the rotor cavity 112 may be released and/or pumped from the rotor cavity 112 as shown by arrows 143 (see, e.g., FIGS. 1,2). At least a portion of the working fluid may be recirculated (step 627) from the rotor cavity 112 to the compressor 106 (see, e.g., FIG. 1). The working fluid passing from the rotor cavity 112 may be pumped therefrom (step 629) (see, FIG. 1).

The flow of the working fluid may be selectively manipulated (step 633) as it passes through the thermodynamic system 100. Various devices, such as valves 134, 136, heat exchangers 162, 160, and pump 163, may be used to manipulate the fluid (see, e.g., FIG. 1).

To further demonstrate the operation of the thermodynamic system, an example of an operation using the thermodynamic system of FIGS. 1-4 is provided. This example is used to further clarify the operation, and is not intended to limit the invention herein. In this example, the thermodynamic system 100 is provided with a supercritical CO2 working fluid having a critical pressure of about 1069 psia (7.37 MPa) and temperature of about 304.1 K.

Near the critical point, the CO2 working fluid typically has a high density (about 50-60% of water) and a high-pressure (about 2-20 MPa). When operating at supercritical conditions, the fluid density of the CO2 working fluid is near the density of a liquid (e.g., water), but typically behaves like a gas in that it fills the entire volume of a container (as does a gas) and has the viscosity of a gas. The very high density of the CO2 working fluid at its critical point may be used to enable high power densities for the TAC.

In cases, such as this, where the working fluid has a high density near liquids rather than gases, the TAC design may be very compact. For example, a TAC 102 using the CO2 working fluid and operating at a power output of about 100-300 kWe may be provided with a housing having a diameter of about 12 inches (30.48 cm) and a length of about 24 inches (60.96 cm). The TAC also preferably has a rotor shaft 110 with a small radius of about 1 inch (2.54 cm) and permanent magnet (or other rotors) of about 9 inches (22.86) in length. In another example, a 20 MW electrical system may be provided with a compressor diameter of about 5-6 inches (12.7-15.24 cm) and a turbine diameter of about 10-12 inches (25.4-30.48 cm). A 200 MW electric system will typically increase this dimensions by another factor of about three (3) to about (4). The TAC is preferably operated with supercritical working fluids under near supercritical conditions to provide a reduction of size from that of typical thermodynamic systems.

The size of the TAC is also preferably reduced to generating higher rotary speeds. When using supercritical working fluids with high densities, shaft speeds for the TAC may be increased to, for example about 75,000 rpm for a power output of about 150 kWe. In this example, the TAC 102 may be provided with a rotor shaft having a 1 inch (2.54 cm) radius and a 12 inches (30.48 cm) length, and the alternator with a permanent magnet having a radius of 1.05 inches (2.67 cm), a length of 6.6 inches (16.76 cm) and a gap of 0.125 inches (0.32 cm). Preferably, the diameter of the rotor shaft is reduced to further reduce the windage losses.

Preferably, the pressure at the compressor inlet 270 (FIG. 2) is provided at just above the critical pressure and temperature of the supercritical working fluid (for example at about 1070 psia (7.38 MPa) and 305K for CO2). Preferably, the pressure in the rotor cavity (200 psia (1.38 MPa)) is kept below the supercritical pressure of the CO2 working fluid for compatibility and to reduce windage loss effects. As described with respect to FIGS. 1 and 2, the rotor cavity 112 is isolated from high-pressure cavities 278, 280 by seals 182. The pressure in the rotor cavity may be lowered by using a pump 163 to lower the rotor cavity pressure where the bearings 114,215 and rotor are located. Preferably, the rotor cavity pressure is lowered sufficiently below the inlet pressure to reduce failures and/or improve performance.

The seals 182 may be used to leak fluid from the higher pressure cavities 278, 280 into the rotor cavity 112 to cool the CO2 working fluid to a liquid as it enters the rotor cavity 112. The liquid preferably passes over the alternator and cools the rotor in such a manner that the rotor shaft continues rotating. The temperature of the liquid is preferably below the incoming fluid in such a manner that provides for expansion of the fluid as is passes through the seals. It is preferable to cool the fluid sufficiently to cool the alternator and/or other components in the rotor cavity without causing freezing of the working fluid. The cool working fluid may also be used to cool the bearings and/or to increase the reliability of the bearings.

The pressure in the rotor cavity 112 may also be lowered to reduce the solubility of the elastomers within the wiring. Working fluids, such as CO2 and other refrigerants, may be capable of dissolving various components that may be used in the TAC, such as portions of the stator windings containing organics and elastomers in plastic insulation. While a canned stator may be used to protect itself from the working fluid, the stator and its windings are preferably positioned directly in the working fluid. A reduced pressure in the rotor cavity may be used to reduce the corrosive effect of the working fluid on the components in the TAC.

The pressure of the rotor cavity preferably remains sufficiently below the inlet pressure (up to about 450 psia (3.10 MPa)) to reduce windage losses and/or the likelihood of failures. At a design flow rate of about 3.52 kg/s for the CO2 working fluid, and for a compressor inlet pressure of about 7.69 MPa at about 305.3 K, the estimated power needed to compress the working fluid is about 50 kW. As the rotor cavity pressure is increased, the power loss typically increases. As the rotor cavity pressure ($p_{rcav}$) nears the critical pressure of 1069 psi (7.37 MPa), the power losses (W) may approach about 50 kW.

Power may also be used to pump working fluid from the rotor cavity to lower the rotor cavity pressure. Reducing the rotor cavity pressure typically also reduces the power losses in the system. For example, for a TAC operating at a rotor cavity pressure of about 200 psia (1.38 MPa), the rotor cavity pressure may generate windage losses (W) of only about 5 kW in comparison to the windage loss of about 50 kW for a TAC operating at a rotor cavity pressure near the critical pressure (about a factor of about 10). The rotor cavity may also be provided with other fluids that have lower density (of about 10%, or less than the density of the supercritical fluid) to reduce windage power losses and/or overheating. The rotor cavity pressure and/or density is preferably lowered to a level that optimizes the overall power loss (e.g., power used to operate the system, reduce windage and/or increased pumping power).

It will be understood from the foregoing description that various modifications and changes may be made in the preferred and alternative embodiments of the present invention without departing from its true spirit. For example, the system may be provided with multiple TACs positioned about the fluid circuit with corresponding conduits, components and/or devices to enable operations using the TACs alone and/or in combination, as desired.

What is claimed is:

1. A thermodynamic system for generating power from a supercritical working fluid, comprising:
   a housing;
   a turbine positioned in a turbine cavity of the housing;
   a compressor positioned in a compressor cavity of the housing, the compressor having a high-pressure face facing an inlet of the compressor cavity and a low-pressure face on an opposite side thereof; and
   an alternator positioned in a rotor cavity between the turbine and compressor cavities, the alternator having a rotor shaft operatively connected to the turbine and compressor, the alternator supported in the housing by bearings;
   wherein the compressor has a plurality of ridges extending from the low-pressure face thereof for pumping the supercritical working fluid as it passes over the compressor whereby a pressure differential between the high-pressure face and the low-pressure face is reduced such that thrust is balanced across the compressor.

2. The thermodynamic system of claim 1, wherein the turbine has a plurality of cutouts therein for manipulating the supercritical working fluid as it passes therethrough whereby thrust is balanced across the turbine.

3. The thermodynamic system of claim 1, further comprising a plurality of seals positioned about the alternator for selectively isolating the rotor cavity from the turbine and compressor cavities whereby the supercritical working fluid is selectively leaked into the rotor cavity to reduce the temperature therein.

4. The thermodynamic system of claim 3, wherein the seals are selected from the group consisting of dry lift off, brush, windback, abradable, hole pattern and combinations thereof.

5. The thermodynamic system of claim 1, further comprising a fluid circuit for circulating the supercritical working fluid through the thermodynamic system.

6. The thermodynamic system of claim 5, wherein the fluid circuit comprises at least one selected from the group consisting of a heater, a chiller, a gas booster, a drain, at least one valve, at least one fluid measurer and combinations thereof.

7. The thermodynamic system of claim 1, wherein the bearings are selected from the group consisting of thrust, journal, gas foil, ball, magnetic and tilt bearings.

8. The thermodynamic system of claim 1, further comprising a pump operatively connected to the rotor cavity for selectively lowering pressure therein.

9. The thermodynamic system of claim 1, wherein the supercritical working fluid comprises at least a portion of one selected from the group consisting of an inorganic compound, a noble gas, an olefin, a fuel, a refrigerant, and combinations thereof.

10. The thermodynamic system of claim 1, wherein the supercritical working fluid passes over the compressor at a pressure just above a critical pressure of the supercritical working fluid.

11. A thermodynamic system for generating power from a supercritical working fluid, comprising:
    a housing;
    a turbine positioned in a turbine cavity of the housing;
    a compressor positioned in a compressor cavity of the housing;
    an alternator positioned in a rotor cavity between the turbine and compressor, the alternator having a rotor shaft operatively connected to the turbine and compressor, the alternator supported in the housing by bearings; and
    a plurality of seals positioned about the alternator for selectively isolating the rotor cavity from the turbine and compressor cavities whereby the supercritical working fluid is selectively leaked into the rotor cavity to reduce the temperature therein.

12. The thermodynamic system of claim 11, wherein the compressor has a high-pressure face facing an inlet of the compressor cavity and a low-pressure face opposite thereto, the system further comprising a plurality of ridges extending from the low-pressure face of the compressor for pumping the supercritical working fluid as it passes over the compressor whereby a pressure differential between the high-pressure face and the low-pressure face is reduced such that thrust is balanced across the compressor.

13. The thermodynamic system of claim 12, wherein the turbine has a plurality of cutouts therein for manipulating the supercritical working fluid as it passes therethrough whereby thrust is balanced across the turbine.

14. The thermodynamic system of claim 11, wherein the bearings are selected from the group consisting of thrust, journal, gas foil, ball, magnetic and tilt bearings.

15. The thermodynamic system of claim 11, wherein the seals are selected from the group consisting of dry lift off, brush, windback, abradable, hole pattern and combinations thereof.

16. The thermodynamic system of claim 11, further comprising a pump operatively connected to the rotor cavity for selectively lowering pressure therein.

17. The thermodynamic system of claim 11, wherein the supercritical working fluid comprises at least a portion of one selected from the group consisting of an inorganic compound, a noble gas, an olefin, a fuel, a refrigerant, and combinations thereof.

18. The thermodynamic system of claim 11, wherein the supercritical working fluid enters the compressor cavity at a pressure just above a critical pressure of the supercritical working fluid.

19. The thermodynamic system of claim 11, further comprising a fluid circuit for circulating the supercritical working fluid through the system.

20. The thermodynamic system of claim 19, wherein the fluid circuit comprises at least one selected from the group consisting of a heater, a chiller, a gas booster, a drain, at least one valve, at least one fluid measurer and combinations thereof.

21. A method of generating power from a supercritical working fluid, comprising:
    providing a thermodynamic system, the system comprising
    a housing;
    a turbine positioned in a turbine cavity of the housing;
    a compressor positioned in a compressor cavity of the housing, the compressor having a high-pressure face facing an inlet of the compressor cavity and a low-pressure face on an opposite side thereof, the low-pressure face having a plurality of ridges; and
    an alternator positioned in a rotor cavity between the turbine and compressor cavities, the alternator having a rotor shaft operatively connected to the turbine and compressor, the alternator supported in the housing by bearings;
    compressing a supercritical working fluid by passing the working fluid across the compressor;
    generating a power output by passing the compressed supercritical working fluid across the turbine; and
    balancing thrust across the compressor by pumping the supercritical working fluid with the plurality of ridges as the supercritical working fluid passes over the compressor.

22. The method of claim 21, further comprising balancing thrust across the turbine by manipulating the supercritical working fluid as it passes thereby.

23. The method of claim 21, further comprising selectively isolating the rotor cavity from the turbine and compressor cavities by selectively leaking a portion of the supercritical working fluid past a plurality of seals and into the rotor cavity.

24. The method of claim 21, further comprising recirculating the supercritical working fluid from the turbine back to the compressor.

25. The method of claim 21, further comprising measuring parameters of the supercritical working fluid.

26. The method of claim 21, further comprising releasing at least a portion of the supercritical working fluid from the rotor cavity.

27. The method of claim 26, further comprising re-circulating at least a portion of the supercritical working fluid from the rotor cavity to the compressor.

28. The method of claim 21, further comprising pumping the supercritical working fluid released from the rotor cavity.

29. The method of claim 21, further comprising selectively manipulating the supercritical working fluid as it passes through the thermodynamic system.

* * * * *